United States Patent
Dharmaraju et al.

(10) Patent No.: US 9,264,248 B2
(45) Date of Patent: Feb. 16, 2016

(54) SYSTEM AND METHOD FOR AVOIDING AND RESOLVING CONFLICTS IN A WIRELESS MOBILE DISPLAY DIGITAL INTERFACE MULTICAST ENVIRONMENT

(75) Inventors: Dinesh Dharmaraju, San Diego, CA (US); Judit Martinez Bauza, San Diego, CA (US); Krishnan Rajamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 12/497,447

(22) Filed: Jul. 2, 2009

(65) Prior Publication Data
US 2011/0002255 A1 Jan. 6, 2011

(51) Int. Cl.
H04H 20/71 (2008.01)
H04L 12/18 (2006.01)
H04L 29/12 (2006.01)
H04W 8/26 (2009.01)
H04W 72/00 (2009.01)

(52) U.S. Cl.
CPC ........ *H04L 12/1881* (2013.01); *H04L 29/1232* (2013.01); *H04L 29/12292* (2013.01); *H04L 61/2069* (2013.01); *H04L 61/2092* (2013.01); *H04L 12/189* (2013.01); *H04W 8/26* (2013.01); *H04W 72/005* (2013.01)

(58) Field of Classification Search
CPC ............ H04W 60/005; H04W 72/005; H04W 36/026; H04H 20/71
See application file for complete search history.

(56) References Cited

U.S. PATENT DOCUMENTS

| | | |
|---|---|---|
| 4,791,554 A | 12/1988 | Hirota et al. |
| 5,828,370 A | 10/1998 | Moeller et al. |
| 5,835,723 A | 11/1998 | Andrews et al. |
| 5,925,137 A | 7/1999 | Okanoue et al. |
| 6,014,706 A | 1/2000 | Cannon et al. |

(Continued)

FOREIGN PATENT DOCUMENTS

| | | |
|---|---|---|
| CN | 1437355 A | 8/2003 |
| CN | 1561609 A | 1/2005 |

(Continued)

OTHER PUBLICATIONS

Dorot, V., et al., "An Explanatory Dictionary of Modern Computer Terms," 2nd Edition, BHV-Petersburg Publishers, Saint Petersburg, 2001, 'Program Product' on p. 339.

(Continued)

*Primary Examiner* — Anez Ebrahim
(74) *Attorney, Agent, or Firm* — Paul Kuo

(57) ABSTRACT

Systems and methods for avoiding conflict in a wireless mobile display digital interface (WMDDI) environment including both host and client devices. In one aspect, the presently claimed invention includes a system and/or method that is configured for broadcasting a first multicast MAC address by a first host to at least one first client in a predetermined geographic area and broadcasting the first multicast MAC address by a second host to at least one second client in the predetermined geographic area. The system and/or method can be further configured for determining a priority between the first host and the second host when the second host receives multicast packets transmitted by the first host and changing to a second multicast MAC address by a least priority host of the first host and the second host.

44 Claims, 6 Drawing Sheets

(56) References Cited

U.S. PATENT DOCUMENTS

| | | | |
|---|---|---|---|
| 6,049,549 A | 4/2000 | Ganz et al. | |
| 6,195,680 B1 | 2/2001 | Goldszmidt et al. | |
| 6,252,889 B1 | 6/2001 | Patki et al. | |
| 6,266,690 B1 | 7/2001 | Shankarappa et al. | |
| 6,400,720 B1 | 6/2002 | Ovadia et al. | |
| 6,424,626 B1 | 7/2002 | Kidambi et al. | |
| 6,515,992 B1 | 2/2003 | Weston et al. | |
| 6,594,699 B1 | 7/2003 | Sahai et al. | |
| 6,608,841 B1 | 8/2003 | Koodli | |
| 6,748,195 B1 | 6/2004 | Phillips | |
| 6,760,772 B2 | 7/2004 | Zou et al. | |
| 6,801,530 B1 | 10/2004 | Brandt et al. | |
| 6,876,857 B1 | 4/2005 | Nee et al. | |
| 6,917,976 B1 | 7/2005 | Slaughter et al. | |
| 6,963,921 B1 | 11/2005 | Yang et al. | |
| 7,035,281 B1 | 4/2006 | Spearman et al. | |
| 7,072,984 B1 | 7/2006 | Polonsky et al. | |
| 7,080,151 B1 * | 7/2006 | Borella et al. | 709/230 |
| 7,085,420 B2 | 8/2006 | Mehrotra | |
| 7,324,462 B1 | 1/2008 | Page et al. | |
| 7,328,021 B1 | 2/2008 | Satapathy | |
| 7,333,464 B2 | 2/2008 | Yang et al. | |
| 7,366,204 B2 | 4/2008 | Kang et al. | |
| 7,373,415 B1 | 5/2008 | Deshan et al. | |
| 7,376,155 B2 | 5/2008 | Ahn et al. | |
| 7,477,659 B1 | 1/2009 | Nee et al. | |
| 7,519,470 B2 | 4/2009 | Brasche et al. | |
| 7,529,823 B2 | 5/2009 | Trufinescu et al. | |
| 7,565,357 B2 | 7/2009 | Rao | |
| 7,688,859 B2 | 3/2010 | Chen et al. | |
| 7,696,980 B1 | 4/2010 | Piot et al. | |
| 7,712,670 B2 | 5/2010 | Sauerwein, Jr. et al. | |
| 7,716,385 B2 | 5/2010 | Saint-Hilaire et al. | |
| 7,719,972 B2 | 5/2010 | Yuan et al. | |
| 7,720,096 B2 | 5/2010 | Klemets | |
| 7,768,536 B2 | 8/2010 | Hyatt | |
| 7,835,406 B2 | 11/2010 | Oran et al. | |
| 7,881,315 B2 | 2/2011 | Haveson et al. | |
| 7,929,475 B2 | 4/2011 | Simonson et al. | |
| 8,001,384 B2 | 8/2011 | Yamamoto et al. | |
| 8,102,849 B2 | 1/2012 | Martinez Bauza et al. | |
| 8,157,168 B2 | 4/2012 | Sauerwein, Jr. et al. | |
| 8,364,201 B1 | 1/2013 | Fujisaki | |
| 8,406,961 B2 | 3/2013 | Pathak et al. | |
| 8,428,048 B2 | 4/2013 | Walker et al. | |
| 8,437,347 B2 | 5/2013 | Casaccia et al. | |
| 8,466,870 B2 | 6/2013 | Cohen et al. | |
| 8,517,251 B2 | 8/2013 | Cohen et al. | |
| 8,593,996 B2 | 11/2013 | Lee et al. | |
| 8,605,048 B2 | 12/2013 | Ye et al. | |
| 8,605,584 B2 | 12/2013 | Leung et al. | |
| 8,612,619 B2 | 12/2013 | Guo et al. | |
| 8,724,696 B2 | 5/2014 | Byford et al. | |
| 8,966,131 B2 | 2/2015 | Huang et al. | |
| 2002/0007494 A1 | 1/2002 | Hodge | |
| 2002/0035621 A1 | 3/2002 | Zintel et al. | |
| 2002/0097718 A1 * | 7/2002 | Korus et al. | 370/390 |
| 2003/0031152 A1 | 2/2003 | Gohda et al. | |
| 2003/0064752 A1 | 4/2003 | Adachi et al. | |
| 2003/0110297 A1 | 6/2003 | Tabatabai et al. | |
| 2003/0142631 A1 | 7/2003 | Silvester | |
| 2003/0152098 A1 * | 8/2003 | Zhu | 370/432 |
| 2003/0167171 A1 | 9/2003 | Calderone et al. | |
| 2003/0225737 A1 * | 12/2003 | Mathews | 707/1 |
| 2004/0039934 A1 | 2/2004 | Land et al. | |
| 2004/0071169 A1 | 4/2004 | Abe et al. | |
| 2004/0083284 A1 | 4/2004 | Ofek et al. | |
| 2004/0103282 A1 | 5/2004 | Meier et al. | |
| 2004/0147264 A1 | 7/2004 | Ogawa | |
| 2004/0160967 A1 | 8/2004 | Fujita et al. | |
| 2004/0202249 A1 | 10/2004 | Lo et al. | |
| 2004/0214571 A1 | 10/2004 | Hong | |
| 2005/0021810 A1 | 1/2005 | Umemura et al. | |
| 2005/0044142 A1 * | 2/2005 | Garrec et al. | 709/204 |
| 2005/0058090 A1 | 3/2005 | Chang et al. | |
| 2005/0060750 A1 | 3/2005 | Oka et al. | |
| 2005/0085239 A1 | 4/2005 | Cedervall | |
| 2005/0096086 A1 | 5/2005 | Singamsetty | |
| 2005/0102699 A1 | 5/2005 | Kim et al. | |
| 2005/0111361 A1 | 5/2005 | Hosein | |
| 2005/0130611 A1 | 6/2005 | Lu et al. | |
| 2005/0136990 A1 | 6/2005 | Hardacker et al. | |
| 2005/0138193 A1 | 6/2005 | Encarnacion et al. | |
| 2005/0144225 A1 | 6/2005 | Anderson et al. | |
| 2005/0149976 A1 | 7/2005 | Lupoi et al. | |
| 2005/0152330 A1 | 7/2005 | Stephens et al. | |
| 2005/0166241 A1 | 7/2005 | Kim et al. | |
| 2005/0175321 A1 | 8/2005 | Aridome et al. | |
| 2005/0176429 A1 | 8/2005 | Lee et al. | |
| 2005/0184993 A1 | 8/2005 | Ludwin et al. | |
| 2005/0198663 A1 | 9/2005 | Chaney et al. | |
| 2005/0219266 A1 | 10/2005 | Koutani et al. | |
| 2005/0266798 A1 | 12/2005 | Moloney et al. | |
| 2005/0267946 A1 | 12/2005 | An et al. | |
| 2006/0002320 A1 | 1/2006 | Costa-Requena et al. | |
| 2006/0002395 A1 | 1/2006 | Araki et al. | |
| 2006/0013182 A1 | 1/2006 | Balasubramanian et al. | |
| 2006/0028398 A1 | 2/2006 | Willmore | |
| 2006/0050640 A1 | 3/2006 | Jin et al. | |
| 2006/0053459 A1 | 3/2006 | Simerly et al. | |
| 2006/0058003 A1 | 3/2006 | Lee | |
| 2006/0069797 A1 | 3/2006 | Abdo et al. | |
| 2006/0098593 A1 | 5/2006 | Edvardsen et al. | |
| 2006/0101146 A1 | 5/2006 | Wang | |
| 2006/0103508 A1 | 5/2006 | Sato | |
| 2006/0133414 A1 | 6/2006 | Luoma et al. | |
| 2006/0136963 A1 | 6/2006 | Oh et al. | |
| 2006/0146009 A1 | 7/2006 | Syrbe et al. | |
| 2006/0187964 A1 | 8/2006 | Li et al. | |
| 2006/0198448 A1 | 9/2006 | Aissi et al. | |
| 2006/0199537 A1 | 9/2006 | Eisenbach | |
| 2006/0202809 A1 | 9/2006 | Lane et al. | |
| 2006/0203805 A1 | 9/2006 | Karacali-Akyamac et al. | |
| 2006/0206340 A1 | 9/2006 | Silvera et al. | |
| 2006/0209787 A1 * | 9/2006 | Okuda | 370/351 |
| 2006/0218298 A1 | 9/2006 | Knapp et al. | |
| 2006/0222246 A1 | 10/2006 | Murai et al. | |
| 2006/0223442 A1 | 10/2006 | Stephens | |
| 2006/0233191 A1 | 10/2006 | Pirzada et al. | |
| 2006/0236250 A1 | 10/2006 | Gargi | |
| 2006/0256851 A1 | 11/2006 | Wang et al. | |
| 2006/0268869 A1 * | 11/2006 | Boers et al. | 370/390 |
| 2006/0270417 A1 | 11/2006 | Chi | |
| 2006/0288008 A1 | 12/2006 | Bhattiprolu et al. | |
| 2007/0004387 A1 | 1/2007 | Gadamsetty et al. | |
| 2007/0008922 A1 | 1/2007 | Abhishek et al. | |
| 2007/0016654 A1 | 1/2007 | Bowles et al. | |
| 2007/0022195 A1 | 1/2007 | Kawano et al. | |
| 2007/0037600 A1 | 2/2007 | Fukuda | |
| 2007/0043550 A1 | 2/2007 | Tzruya | |
| 2007/0057865 A1 | 3/2007 | Song et al. | |
| 2007/0057885 A1 | 3/2007 | Kurumisawa et al. | |
| 2007/0061433 A1 | 3/2007 | Reynolds et al. | |
| 2007/0104215 A1 | 5/2007 | Wang et al. | |
| 2007/0126715 A1 | 6/2007 | Funamoto | |
| 2007/0141984 A1 | 6/2007 | Kuehnel et al. | |
| 2007/0141988 A1 | 6/2007 | Kuehnel et al. | |
| 2007/0157283 A1 | 7/2007 | Setlur et al. | |
| 2007/0162945 A1 | 7/2007 | Mills | |
| 2007/0171910 A1 | 7/2007 | Kumar | |
| 2007/0182728 A1 | 8/2007 | Fujimori | |
| 2007/0211041 A1 | 9/2007 | Lai et al. | |
| 2007/0259662 A1 | 11/2007 | Lee et al. | |
| 2007/0264988 A1 | 11/2007 | Wilson et al. | |
| 2007/0264991 A1 | 11/2007 | Jones et al. | |
| 2007/0274400 A1 | 11/2007 | Murai et al. | |
| 2007/0291636 A1 | 12/2007 | Rajagopal et al. | |
| 2007/0292135 A1 | 12/2007 | Guo et al. | |
| 2007/0299778 A1 | 12/2007 | Haveson et al. | |
| 2008/0005348 A1 | 1/2008 | Kosiba et al. | |
| 2008/0013658 A1 | 1/2008 | Lewis et al. | |
| 2008/0018657 A1 | 1/2008 | Montag | |
| 2008/0031210 A1 | 2/2008 | Abhishek et al. | |
| 2008/0037506 A1 | 2/2008 | Dharmaraju et al. | |

(56) References Cited

U.S. PATENT DOCUMENTS

| | | |
|---|---|---|
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1* | 8/2008 | Yamagishi .................... 370/390 |
| 2008/0205394 A1* | 8/2008 | Deshpande et al. .......... 370/390 |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1 | 10/2013 | Lee |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |
| 2014/0120829 A1 | 5/2014 | Bhamidipati et al. |
| 2014/0210693 A1 | 7/2014 | Bhamidipati et al. |
| 2014/0372620 A1 | 12/2014 | Vedula et al. |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| EP | 1206080 A1 | 5/2002 |
| EP | 1233326 A2 | 8/2002 |
| EP | 1235392 A1 | 8/2002 |
| EP | 1325591 A1 | 7/2003 |

(56) References Cited

FOREIGN PATENT DOCUMENTS

| | | |
|---|---|---|
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 | 1/2009 |
| JP | 2009033348 A | 2/2009 |
| JP | 2009071580 | 4/2009 |
| JP | 2009083896 | 4/2009 |
| JP | 2009147893 | 7/2009 |
| JP | 2009537051 | 10/2009 |
| JP | 2010033548 | 2/2010 |
| JP | 2010068537 | 3/2010 |
| JP | 2010098344 | 4/2010 |
| JP | 2010178147 | 8/2010 |
| JP | 2012044746 | 3/2012 |
| JP | 2012525773 | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| TW | 200838310 A | 9/2008 |
| TW | 200943168 A | 10/2009 |
| WO | WO0184291 A1 | 11/2001 |
| WO | WO0210942 | 2/2002 |
| WO | 0223825 A1 | 3/2002 |
| WO | WO0249314 A2 | 6/2002 |
| WO | WO-03030451 A1 | 4/2003 |
| WO | 03061240 A1 | 7/2003 |
| WO | WO-03104834 A2 | 12/2003 |
| WO | 2004034646 A1 | 4/2004 |
| WO | WO-2004030351 A1 | 4/2004 |
| WO | WO-2004051962 A1 | 6/2004 |
| WO | 2005107187 A1 | 11/2005 |
| WO | WO-2005109781 A1 | 11/2005 |
| WO | WO2005122509 | 12/2005 |
| WO | WO-2006007352 A1 | 1/2006 |
| WO | WO-2006020304 A2 | 2/2006 |
| WO | WO2006135289 A1 | 12/2006 |
| WO | WO2007000757 | 1/2007 |
| WO | WO-2007009876 A1 | 1/2007 |
| WO | 2007013334 A1 | 2/2007 |
| WO | WO2007021269 | 2/2007 |
| WO | WO-2007033049 A2 | 3/2007 |
| WO | 2007098425 A1 | 8/2007 |
| WO | WO-2007133483 A1 | 11/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009015322 A2 | 1/2009 |
| WO | 2009040918 A1 | 4/2009 |
| WO | 2010120878 A2 | 10/2010 |
| WO | 2010126727 A2 | 11/2010 |
| WO | 2011003089 A1 | 1/2011 |
| WO | WO-2011002141 A1 | 1/2011 |
| WO | 2012096546 A2 | 7/2012 |

OTHER PUBLICATIONS

Euihyeok Kwon, et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE.

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.

(56) References Cited

OTHER PUBLICATIONS

Miller B., et al., "Mapping salutation architecture APIs to Bluetooth service discovery layer," Bluetooth White Paper, [Online} pp. 1-25, Jul. 1, 1999, XP002511956.
Myers, et al: "Collaboration Using Multiple PDAS Connected to a PC," Proceedings of the ACM Conference on Computer Supported Cooperative Work (CSCW), Nov 14, 1998, pp. 285-294, ISBN: 978-1-58113-009-6.
Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.
Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.
Helmy A: "Architectural framework for large-scale multicast in mobile ad hoc networks" Proceedings of IEEE International Conference on Communications—Apr. 28-May 2, 2002—New York, NY, USA, IEEE, Piscataway NJ USA LNKDDOI: 10.1109/ICC.2002. 997206, vol. 4, Apr. 28, 2002, pp. 2036-2042, XP010589844 ISBN: 978-0-7803-7400-3.
International Search Report and Written Opinion—PCT/US2010/040650—International Search Authority, European Patent Office,Nov. 16, 2010.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Brandenburg, et al., AVTCore, RTCP for inter-destination media syncronization, Internet Draft, draft-ietf-avtcore-idms-092.txt, Oct. 31, 2011.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol . MCD, No. V1. 1. 1, Dec. 1, 2010, XP014061814, section 5.
Mihai Mitrea et al: "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Nave I et al., "Games@large graphics streaming architecture ", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802. 15.3c mmW WPAN: (2) Target applications and Usage Models", IEICE Tech. Rep., vol. 106, No. 555, RCS2006-279, pp. 179-182, Feb. 2007.
Wenger et al., "RTP Payload Format for H.264 Video," Network Working Group, RFC 3984, Feb. 2005, 78 pp.
Co-pending U.S. Appl. No. 10/236,657, filed Sep. 6, 2002.
Video Electronics Standards Association (VESA) Mobile Display Digital Interface Standard (MDDI), Jul. 2004.
"Bluetooth Specification Version 1.1" published Feb. 22, 2001; Section 1 pp. 41-42;.Section 2.1, p. 43; Section 4.1-2, pp. 47-50; Section 10.9, p. 120; and Section 11, pp. 126-137.
Byungjoo Lee, U.S. Appl. No. 61/433,942, filed Jan 18, 2011.
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
DDJ., "Research on Windows Programming with Visual C++, Final Issue, Overcoming WIN32 Hook Processing in MFC Programming", Feb. 1996 issue (vol. 5,No. 2, No. 61 in all), Shoeisha Co., Ltd., Feb. 1, 1996, pp. 66-77.
International Preliminary Report on Patentability—PCT/US2013/020155, The International Bureau of Wipo—Geneva, Switzerland, Jul. 17, 2014.
Hayakawa A., "Operate multiple machines by remote control software", VNCThing, Mac Power, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
"Raster Graphics" Wikipedia. Wikimedia Foundation, Jan. 29, 2011, Web, Apr. 1, 2015. <http://en.wikipedia.org/w/index.php?title=Raster_graphics&oldid=41 0775304>.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.
Wikipedia entry for UPnP List of UPnP AV media servers and clients (captured Aug. 20, 2010), pp. 1-10, Retrieved from the Internet URL: web.archive.org/web/20100820133238/http://en.wikipedia.org/wiki/List_of_UPnP_AV_media_servers_and_clients >:, whole document.
Wikipedia entry of header (captured Aug. 30, 2010), 1 Page, Retrieved from the Internet URL: web.archive.org/web/20100830154156/http://en.wikipedia.org/wiki/Header_(computing) >, whole document.

* cited by examiner

SYSTEM AND METHOD FOR AVOIDING AND RESOLVING CONFLICTS IN A WIRELESS MOBILE DISPLAY DIGITAL INTERFACE MULTICAST ENVIRONMENT

REFERENCE TO CO-PENDING APPLICATIONS FOR PATENT

The present Application for Patent is related to the following co-pending U.S. patent applications:

"Wireless Architecture for a Traditional Wire-Based Protocol", U.S. patent application Ser. No. 11/624,642, filed on Jan. 18, 2007;

"Wireless Architecture for a Traditional Wire Based Protocol", U.S. patent application Ser. No. 11/624,634, filed on Jan. 18, 2007; and "Wireless Architecture for a Traditional Wire-Based Protocol", U.S. patent application Ser. No. 12/179,411, filed Jul. 24, 2008, all filed concurrently herewith, assigned to the assignee hereof and expressly incorporated by reference herein.

BACKGROUND

1. Field

The presently claimed invention relates generally to the field of communications, and more specifically to the field of wireless communications in a network having multiple nodes.

2. Background

Recent trends in communications have demonstrated that visual content is becoming a more important aspect of both the communications themselves as well as the devices that enable such communications. For example, displays have become much more integral to the operation of mobile phones in recent years. The mobile display digital interface (MDDI) protocol has been adopted by many manufacturers and users as a cost-effective and low-power solution that enables high-speed short-range communication with a display device, for example a display portion of a clamshell-type or flip-phone. The MDDI protocol typically utilizes a miniature connector system and a thin flexible cable for connecting portable computing, communications and entertainment devices to displays, generally referred to as a host and a client, respectively. However, with the development of high-speed wireless technologies such as ultra wideband and 802.11n, there is a growing desire for wireless communications between computing platforms and displays. Wireless USB has been introduced as one option for wireless communication between devices. However, unlike a MDDI system, wireless USB operates within the framework of the wiMedia UWB MAC, which unfortunately ties the communications protocol very heavily to the underlying MAC structure, which in turn complicates operation of wireless USB systems making them less than optimal for many applications.

As noted above, in a wired MDDI system, the host and client devices are connected by actual cabling, which forms the basis for the association between the host and the client. In a wireless system; however, there is no automatic, physical link creating an association between the host and client, which can lead to numerous difficulties with association, security, inefficient use of air link bandwidth, and conflicting addresses, packets and/or communication protocols from differing hosts and/or clients.

Accordingly, there is a need in the art for a system and/or method for wireless MDDI communications that ensures proper association between a host and a client, as well as efficient and secure communications there between.

SUMMARY

The presently claimed invention includes systems and methods for avoiding conflict in a wireless mobile display digital interface (WMDDI) environment including both host and client devices. In one aspect, the presently claimed invention includes a system and/or method that are configured for broadcasting a first multicast address by a first host to at least one first client in a predetermined geographic area and broadcasting the first multicast address by a second host to at least one second client in the predetermined geographic area.

The system and/or method can be further configured for determining a priority between the first host and the second host when the second host receives multicast packets transmitted by the first host and changing to a second multicast address by a least priority host of the first host and the second host.

In another aspect, the presently claimed invention includes a system and/or method for resolving and/or preventing conflicts in a multicast address digital communication system. The system and/or method of conflict resolution can include the step of receiving a first multicast address broadcast by a first device in a first predetermined geographic area at a second device in a predetermined geographic area wherein the first and second geographic areas are at least partially distinct from one another. Upon receipt, the second device can rebroadcast the first multicast address in the second predetermined geographic area, where it can be received by a third, distinct device in the second predetermined geographic area. In other aspects of the presently claimed invention, the third device can then determine if the first and second multicast addresses are identical, and if so, determine a priority between the first and second devices. If the first device is the priority device, then the third device can select and/or generate a third, distinct, multicast address. Likewise, if the second device is the priority device, then the first device can select and/or generate a third, distinct multicast address, thereby preventing any potential conflicts from arising between devices in the first and second predetermined geographic areas.

As described in greater detail below, the systems and/or methods described herein, the WMDDI protocol can be run on top of a high-speed wireless MAC without interfering with the wireless MAC itself, which is a significant drawback to the wireless USB system described above. Compartmentalization of the WMDDI from the wireless MAC greatly improves the efficiency and operation of the host and client communications, while reducing the overall cost of the systems described herein. Other features described herein include a service discovery function, a dynamic association/dissociation function, a mutual authentication and key exchange function, a link status function as well as various specific functionalities to preserve air link bandwidth. Other features and advantages of the presently claimed invention are described in detail below with reference to the following figures.

DETAILED DESCRIPTION

The presently claimed invention is described herein with reference to selected preferred features and aspects thereof with reference to the appended figures. It should be understood by those of skill in the art of communications that the foregoing descriptions are exemplary in nature only, and that the scope of the presently claimed invention is defined by the following claims.

Figure 1:
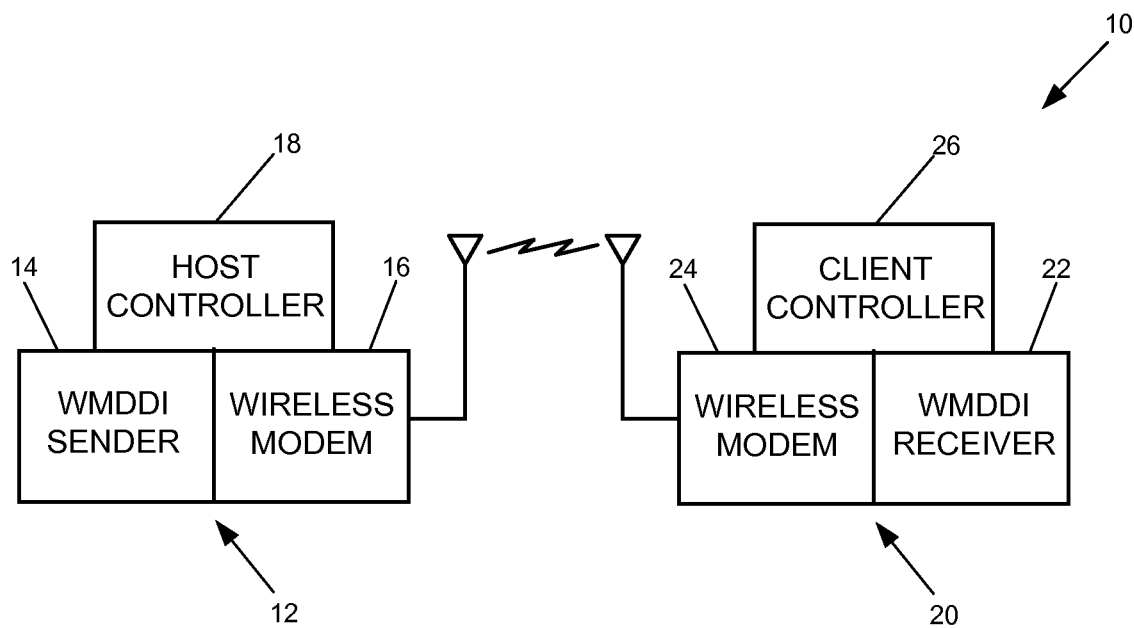
FIG. 1 is a schematic block diagram of a system for avoiding and/or resolving conflicts in a WMDDI multicast environment in accordance with one aspect of the presently claimed invention.

As shown in FIG. 1, a system 10 for avoiding and/or resolving conflicts in a WMDDI multicast environment in accordance with one aspect of the presently claimed invention includes a host device 12 that is wirelessly connectable to a client device 20. Host device 12 can include a WMDDI sender module 14 and a wireless modem 16, each of which is connectable to a host controller 18 adapted to control at least the communications functions of host device 12, including at least those functions described in greater detail below with reference to FIGS. 2 through 8. Host controller 18 can include for example any suitable combination of hardware, firmware, or software that is adapted to control the communications functions of host device 12. Similarly, client device 12 can include a WMDDI receiver module 22 and a wireless modem 24, each of which is connectable to a client controller 26 adapted to control at least the communications functions of client device 20. Client controller 26 can also include, for example, any suitable combination of hardware, firmware, or software that is adapted to control the communications functions of client device 20, including at least those functions described in greater detail below with reference to FIGS. 2 through 8.

Figure 2:
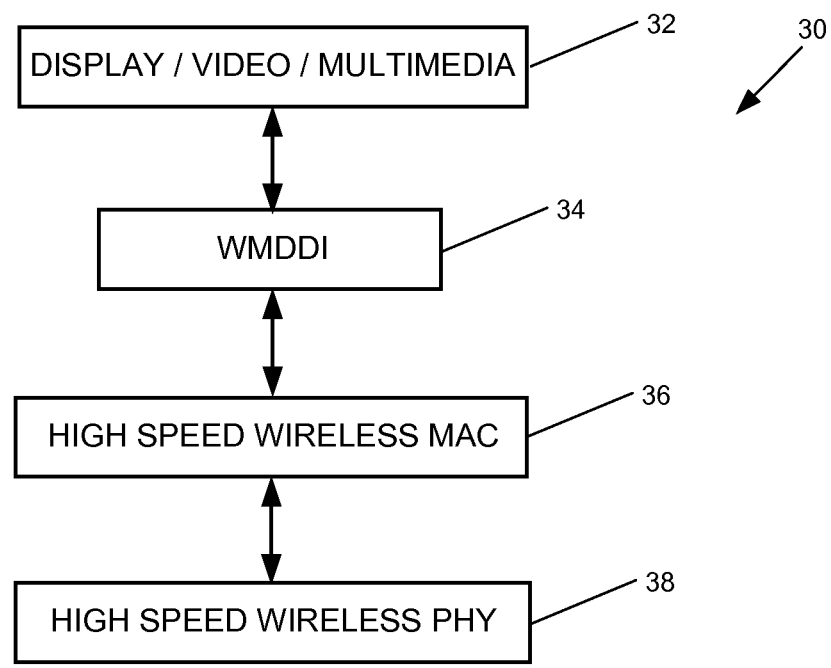
FIG. 2 is a schematic block diagram of a system hierarchy in a WMDDI multicast environment in accordance with one aspect of the presently claimed invention.

Each host device 12 and client device 20 can have a functional system hierarchy 30, one aspect of which is shown in FIG. 2. System hierarchy 30 can include for example a display/video/multimedia layer 32 that is layered on top of a WMDDI protocol layer 34. WMDDI protocol layer 34 is shown layered on top of a high-speed wireless MAC layer 36, which in turn can run on top of a high-speed wireless PHY layer 38. As described more fully herein, WMDDI protocol layer 34 can include a plurality of functions, including but not limited to a service discovery function, a dynamic association/dissociation function, a mutual authentication and key exchange function, a link status function as well as various specific functionalities to preserve air link bandwidth.

Figure 3:
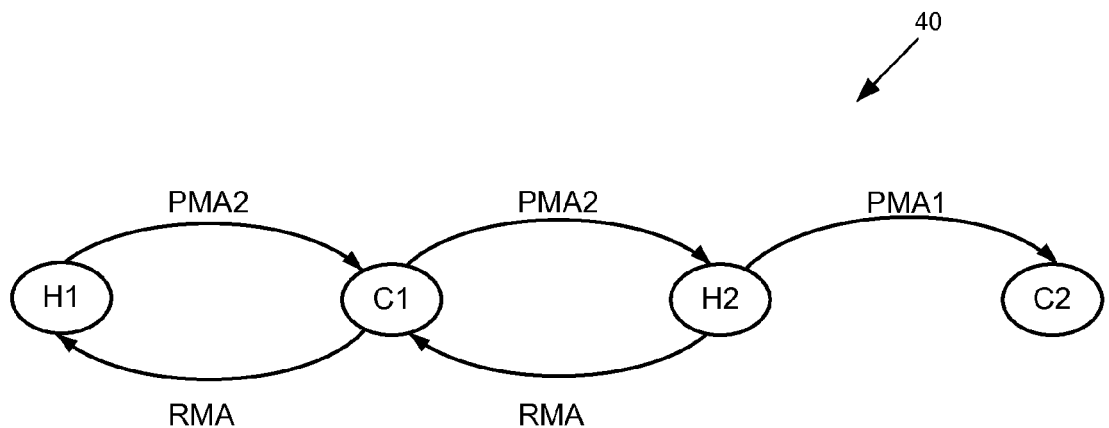
FIG. 3 is a diagram of a system for avoiding and/or resolving conflicts in a WMDDI multicast environment in accordance with one aspect of the presently claimed invention.

As shown in FIG. 3, in one preferred aspect of the presently claimed invention, system 10 is configured such that a first host H1 is adapted to broadcast a first multicast address to at least one client device C1 in a predetermined geographic area, i.e. within a signal range of first host H1. System 10 can be further configured so that a second host H2 broadcasts the first multicast address to at least one second client C2 in the same geographic area, and further such that first host H1 and second host H2 are configured to determine a priority when second host H2 receives multicast address packets transmitted by first host H1, thereby avoiding any potential multicast address conflicts. Depending upon the priority between first host H1 and second host H2, system 10 can be configured such that the least priority one of first host H1 or second host H2 changes to a second multicast address thereby resolving any existing and/or potential multicast address conflicts.

These and other aspects of the presently claimed invention help to alleviate conflict in a broader WMDDI system in which there are multiple hosts and multiple clients all within the same predetermined geographic area. For example, in a case with two hosts A and C and two clients B and D, it is possible in a typical WMDDI system for hosts A and C to have conflicts and/or non-secure communications depending upon the selected multicast addresses. If nodes A and B are in listening range of each other, and nodes B and C are in listening range of each other, and nodes C and D are in listening range of each other, then nodes A and D might possibly become linked if they share the same multicast address and there is no manner by which to determine proper priority and multicast address selection between the two hosts A and C. As such, aspects of the presently claimed invention include a two-hop transmission of a selected multicast address from the initiating host to a client (first hop), and from the client to at least a second host (second hop), so that the second host is aware of the selection of the multicast address and can, at the option of the second host, either reject the multicast address or accept the multicast address depending upon the priority of the devices (e.g., based on respective Media AccessControl addresses associated therewith). As described in more detail herein, the second host is adapted to avoid conflicts through the rejection or the multicast address and selection of a unique address or resolve existing conflicts by determining a priority address and maintaining its existing address or selecting a new address in response to the priority of the respective devices.

As shown in diagram 40 of FIG. 3, first host H1 intends to start a session with one or more clients and selects and broadcasts a PickedMulticastAddress (MA2). Simultaneously, second host H2 is starting its own session with second client C2 using a PickedMulticastAddress, MA1. If the first host H1 were to also select MA1 as its multicast address, then first host H1 might inadvertently start a session with second client C2. In order to avoid this situation, first host H1 broadcasts its MA2 message to at least first client C1 that is within the predetermined geographic area. In response, first client C1 hops the MA2 to at least second host H2. If MA2 is identical to MA1 on which second host H2 is in session with at least a second client C2, then if the address of second host H2 is greater than the address of first host H1, second host H2 responds to first client C1 with a RejectMulticastAddress (RMA) message, which in turn is hopped back to first host H1 so that first host H1 is aware that there is an existing broadcast with the selected address and that second host H2 has priority on that particular address, thus allowing first host H1 to select a different multicast address. Alternatively, if MA2 is distinct from MA1, then there is no conflict between first host H1 and second host H2 for the immediate sessions. Moreover, each of first host H1 and second host H2 are aware of the other's respective multicast address so each host will refrain from starting another session on the other's multicast address unless or until it is determined by both first host H1 and second host H2 that there is no conflict.

Returning to FIG. 1, host device 12 can be configured for operation as first host H1 and second host H2, and client device 20 can be configured for operation as first client C1 and second client C2. As noted above, each host device 12 and client device 20 can include a host controller 18 and a client controller 26, respectively, wherein each of the controllers are configured for operation and execution of the methodologies described herein. Controllers 18 and 26 may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, micro-controllers, microprocessors, electronic devices, other devices units designed to perform the functions described herein, and/or combinations thereof.

For a firmware and/or software implementation of aspects of the presently claimed invention, the systems and/or methodologies may be implemented with modules (e.g., procedures, functions, and so on) that perform the functions described herein. Any machine-readable medium tangibly embodying instructions may be used in implementing the methodologies described herein.

For example, software codes may be stored in a memory, for example the memory associated with one of host device 12 or client device 20, and executed by respective controllers 18 and 26. Memory can be implemented within the processor or external to the processor. As used herein the term "memory" refers to any type of long term, short term, volatile, nonvolatile, or other memory and is not to be limited to any particular type of memory or number of memories, or type of media upon which memory is stored.

Figure 4:
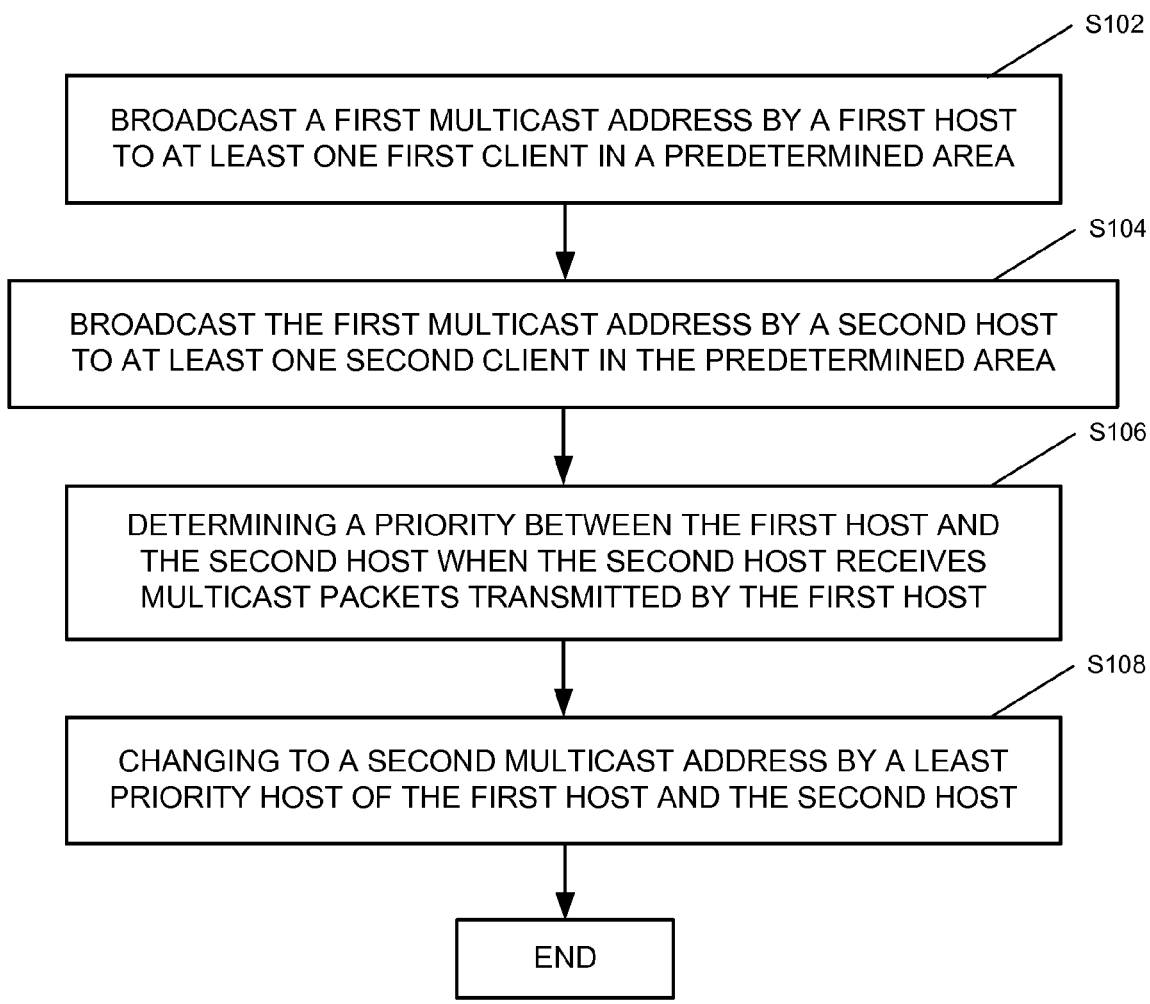
FIG. 4 is a flowchart depicting a method for avoiding conflicts in a WMDDI multicast environment in accordance with one aspect of the presently claimed invention.

As shown in FIG. 4, in one aspect of the presently claimed invention, a method for selecting a multicast address to avoid conflicts in a digital communication system includes step S102, which recites broadcasting a first multicast address by a first host to at least one first client in a predetermined geographic area. In step S104, the method recites broadcasting the first multicast address by a second host to at least one second client in the predetermined geographic area; and in step S106 method recites determining a priority between the first host and the second host when the second host receives multicast packets transmitted by the first host. The method of this preferred aspect of the presently claimed invention further includes step S108, which recites changing to a second multicast address by a least priority host of the first host and the second host.

In one variation of the method of the aspect shown in FIG. 4, the method can further include the step of detecting the at least one second client being in the predetermined geographic area by the first host. The step of detecting the at least one second client can be executed according to the two-hop principle set forth with reference to FIG. 3. The method can further include the steps of receiving the first broadcast multicast address by the at least one second client from the first host, and rebroadcasting the received first multicast address on a first hop count to the second host. As noted above with reference to FIG. 3, the systems and methodologies described herein function to notify, streamline and prioritize communications within a WMDDI network by minimizing the potential for conflicting multicast addresses between two or more host devices.

Figure 5:
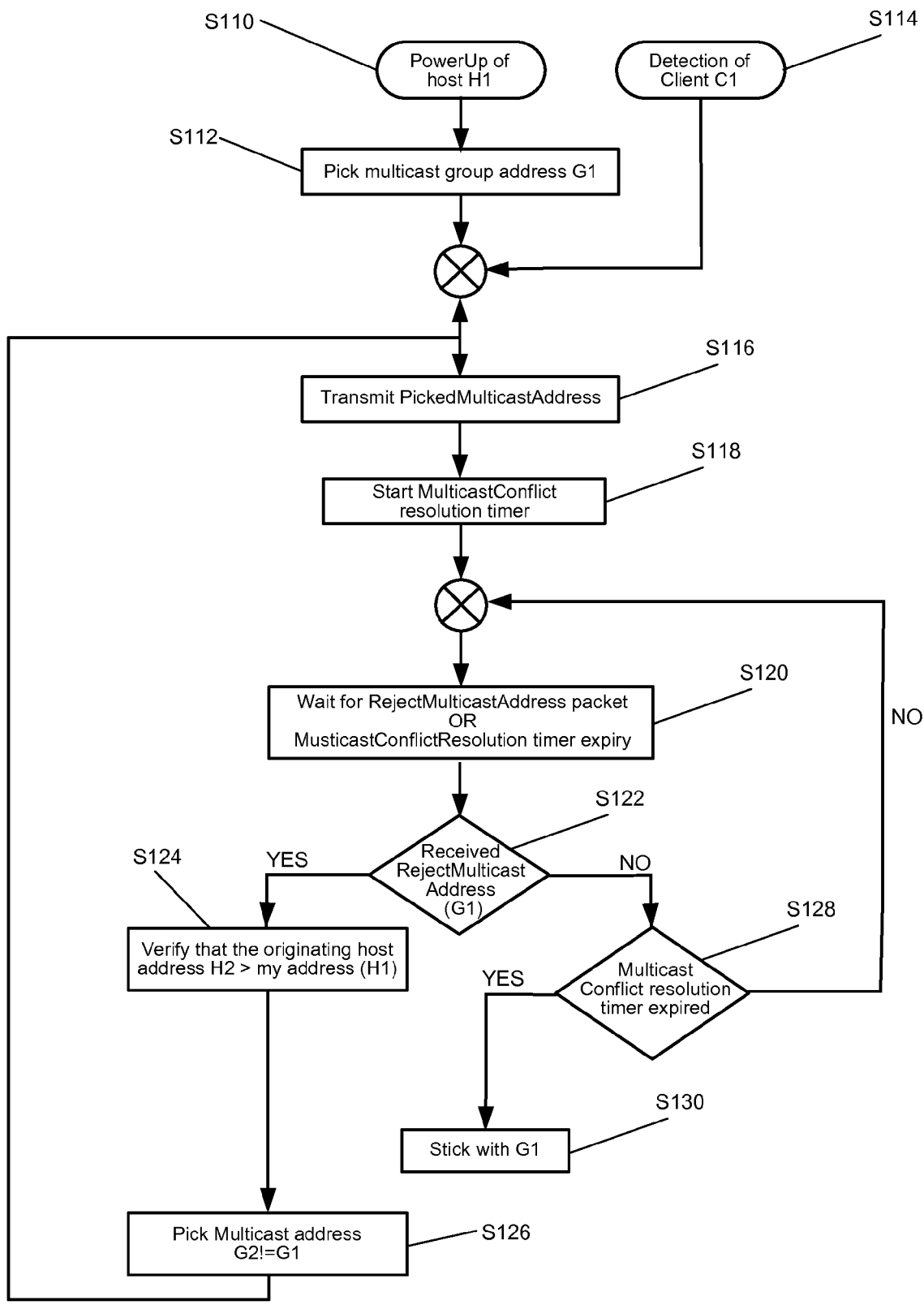
FIG. 5 is a flowchart depicting a method for avoiding and/or resolving conflicts in a WMDDI multicast environment in accordance with one aspect of the presently claimed invention.

Further details of the exemplary methodologies described herein are depicted in the flowchart of FIG. 5, which pertains primarily to methodologies suitable for a host device 12 functioning in a system 10 such as that shown in FIG. 1. In step S110, the host H1 is powered up and in step S112 the host H1 selects a multicast address G1. After detection of a new client in step S114, host H1 transmits its PickedMulticastAddress (PMA) message in the manner described above in step S116. Following transmission of the PMA, the host initiates a Multicast Conflict resolution timer in step S118 which functions to set an upper bound on a time for which the host H1 will wait to see if the multicast group address G1 is already in use by a priority host. In step S120, the method recites one of waiting for a RejectMulticastAddress packet or the expiration of the Multicast Conflict Resolution timer. In step S122, the method shown in FIG. 5 queries whether a RejectMulticastAddress (G1) has been received. If the answer is negative, then the method proceeds to step S128, in which it queries whether the Multicast Conflict Resolution timer has expired. If the Multicast Conflict Resolution timer has expired, then in step S130 the method recites maintaining the multicast group address G1 as the MAC address for the host's session. If the Multicast Conflict Resolution timer has not expired, then the method returns to step S120 described above.

Returning to step S122, if a RejectMulticastAddress (G1) has been received, then the method proceeds to step S124, which recites host H1 verifying that the originating host address (e.g., MAC address) H2 has priority over the address of host H1, i.e. address of itself. Upon verification, then the method proceeds to step S126, in which the method recites picking a different multicast address G2 that is not G1, after which the method returns to step S116 and transmits a new PickedMulticastAddress (G2) packet. The exemplary method shown in FIG. 5 functions to ensure the priority of hosts as well as the distinctness of the multicast addresses. As such, in a system 10 such as that described above, each host therein is performing the foregoing steps to ensure that proper priority is allocated and further that each multicast address is unique within the predetermined geographic region.

Figure 6:
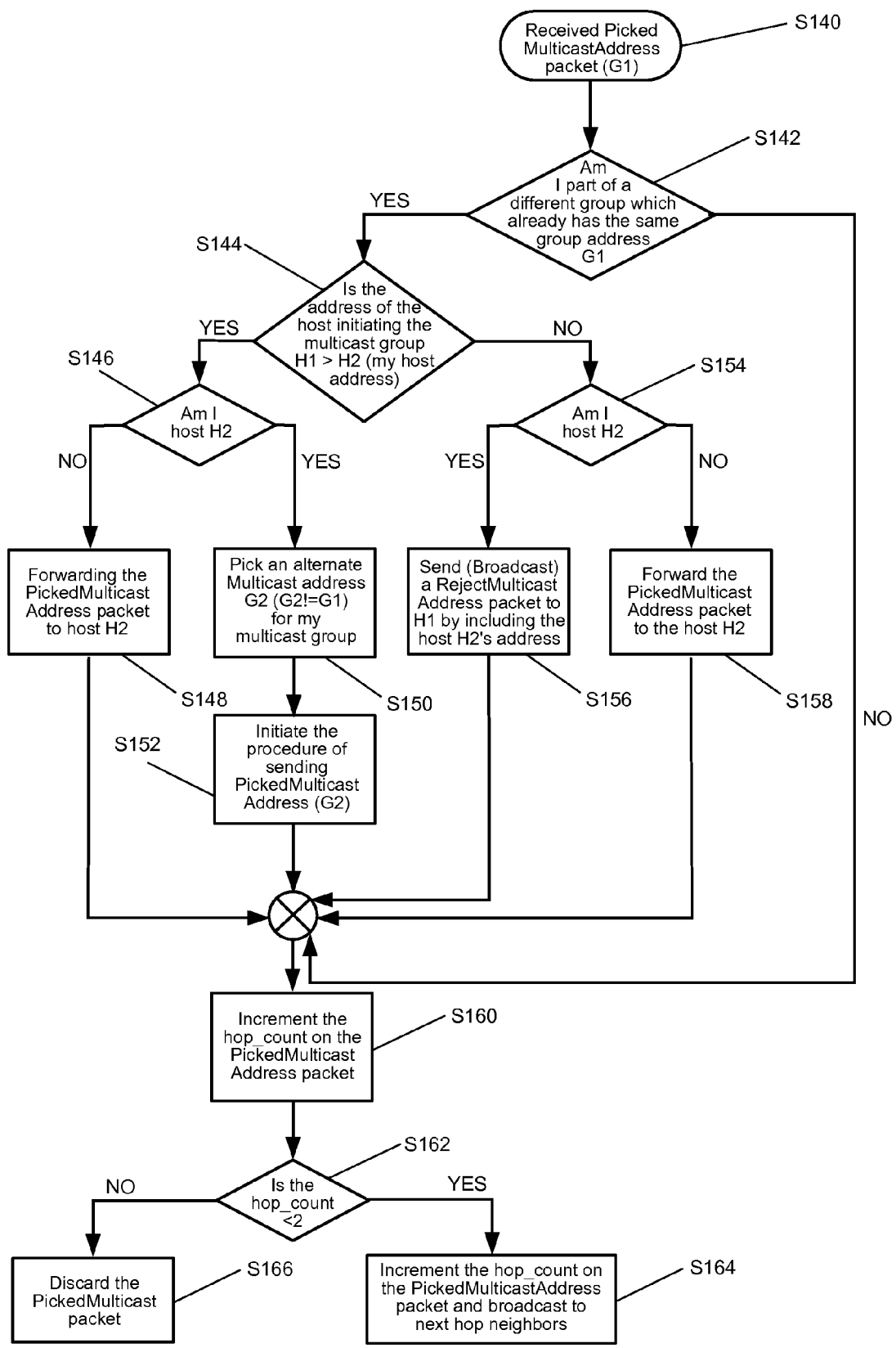
FIG. 6 is a flowchart depicting a method for avoiding and/or resolving conflicts in a WMDDI multicast environment in accordance with one aspect of the presently claimed invention.

FIG. 6 illustrates a methodology appropriate for a recipient such as a host device 12 or client device 20 such as that shown in system 10 described with reference to FIG. 1. In step S140, the example method recites receiving a PickedMulticastAddress (G1), and in step S142, the example method queries whether the device is already a member of a different group having the same group address G1. If the answer is negative, then the method proceeds to step S160, described in more detail below. If the answer is affirmative, then the method proceeds to step S144, in which it queries whether the address (e.g., MAC address) of the host initiating the multicast group has priority over the existing host of the device.

As noted above, the methodologies of the presently claimed invention ascertain both the priority and the uniqueness of the multicast addresses. As such, if the answer to the priority query S144 is affirmative, then the example method queries whether the device is also the second host H2. If the answer is affirmative, then in step S150 the host H2 picks a different multicast address G2, which is different than G1, for its group and then initiates the procedure of sending a PickedMulticastAddress (G2) as set forth above in step S152. If the answer to query S146 is negative, then the device forwards the PickedMulticastAddress to the host H2. If the answer to the priority query S144 is negative, then H1 does not have priority over H2, and so in step S154 the example method queries whether the client device is also the second host H2. If the response is negative, then the example method proceeds to step S158, which recites forwarding the PickedMulticastAddress packet to the host H2. If the response to query S154 is affirmative, then the host H2 broadcasts a Reject Multicast Packet intended for host H1 by including the host's own unicast address of H2 in step S156.

As noted above, in order to prevent inadvertent association between hosts and clients that are not necessarily in the same geographic region, the methodologies of the presently claimed invention employ at least a two-hop communication process. Accordingly, in step S160, the example method recites incrementing the hop count on the PickedMulticastAddress packet to ensure that a predetermined number of hops is attained. For example, in step S162 the example method queries whether the hop count is less than two. If the response is affirmative, then the method proceeds to step S164 to increment the hop count on the PickedMulticastAddress packet and broadcast to the client device's next hop neighbors. On the other hand, if the hop count is two or more, then the example method proceeds to step S166 in which the PickedMulticastAddress packet is discarded as both the priority and uniqueness functions have been performed.

Figure 7:
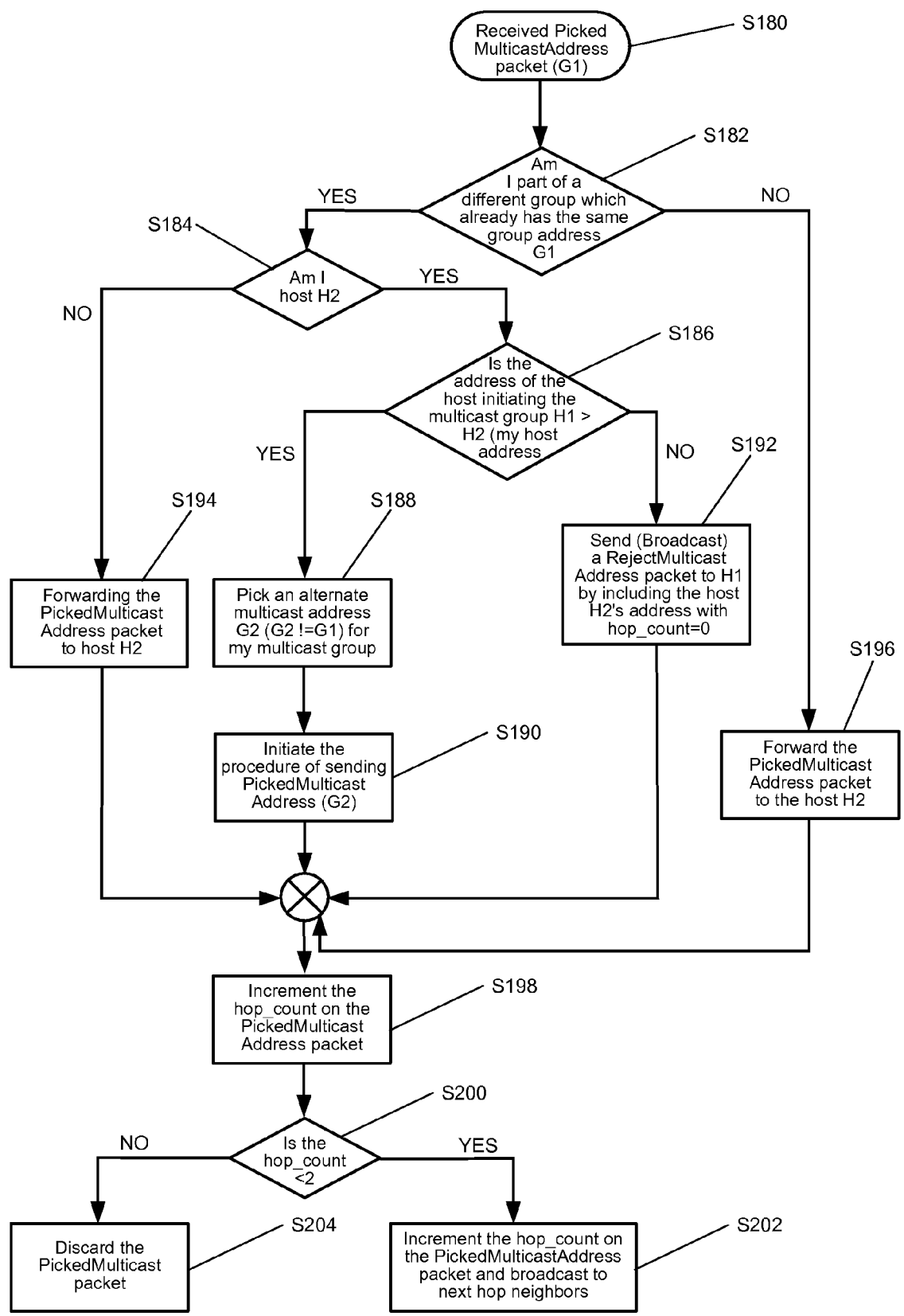
FIG. 7 is a flowchart depicting a method for avoiding and/or resolving conflicts in a WMDDI multicast environment in accordance with one aspect of the presently claimed invention.

FIG. 7 illustrates another example method usable by a packet receiver such as a host or client device in a system of the type described herein. In step S180, the example method recites the step of receiving a PickedMulticastAddress (G1) packet. In step S182, the method queries whether the receiver is a member of a different group that already has the same group address G1. If the query of step S182 is answered in the negative, then the example method proceeds to step S196, which recites the step of forwarding the PickedMulticastAddress packet to the host H2. If the answer to the query of step S182 is affirmative, then the method proceeds to step S184, in which the method further queries whether the receiving device is a second host H2. If the answer to the query of step S184 is negative, then the method proceeds to step S194 in which the PickedMulticastAddress is forwarded to the host H2.

Alternatively, if the answer to the query of step S184 is affirmative, then the method proceeds to step S186 in which it queries whether the address (e.g., MAC address) of the host initiating the multicast group has priority over the address of the host H2, which is the host for the current group. If the response to the query of step S186 is negative, then in step S192 the host H2 broadcasts a RejectMulticastAddress packet destined for host H1, by including the host H2's address with a hop count equal to zero. If the response to the query of step S186 is affirmative, then in step S188 the host H2 selects an alternate multicast address G2 distinct from G1 for its own multicast group. Following selection of the new multicast address G2, the method directs the host H2 to initiate the procedure for sending PickedMulticastAddress (G2) in step S190.

As in the previous example methods, in order to prevent inadvertent association between hosts and clients that are not necessarily in the same geographic region, the methodologies of the presently claimed invention employ at least a two-hop communication process. Accordingly, in step S198, the example method recites incrementing the hop count on the PickedMulticastAddress packet to ensure that a predetermined number of hops is attained. For example, in step S200 the example method queries whether the hop count is less than two. If the response is affirmative, then the method proceeds to step S202 to increment the hop count on the PickedMulticastAddress packet and broadcast to the device's next hop neighbors. On the other hand, if the hop count is two or more, then the example method proceeds to step S204 in which the PickedMulticastAddress packet is discarded as both the priority and uniqueness functions have been performed.

Figure 8:
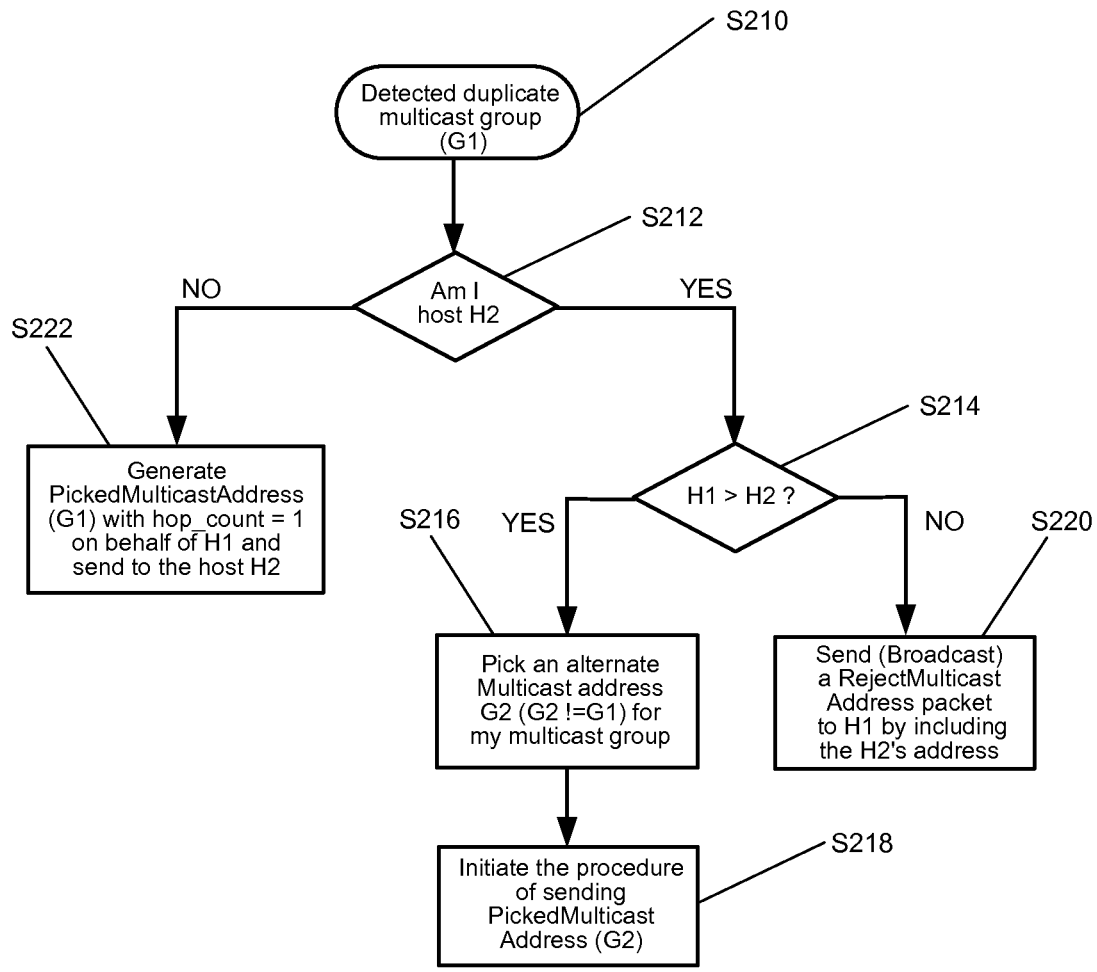
FIG. 8 is a flowchart depicting a method for avoiding conflicts in a WMDDI multicast environment in accordance with one aspect of the presently claimed invention.

Another example method usable by a packet receiver such as a host or client device in a system of the type described herein is shown in FIG. 8. In particular, the example methodology set forth in FIG. 8 is usable by a device that is a member of a multicast group G1 started by host H2 in which the device has either received multicast packets from a different host H1 or received a beacon, signal or packet indicating that host H1 has started a different group with the same address G1. This can happen if two distinct groups come into wireless contact with each other either because of mobility or due to changes in the wireless environment. The example method shown in FIG. 8 begins in step S210 in which the device detects a duplicate multicast group (G1). In step S212, the example method queries whether the receiving device is the host H2. If the response is negative, then in step S222 the example method recites generating a PickedMulticastAddress (G1) with a hop count of one on behalf of H1 and transmitting the same to host H2, thereby notifying host H2 of a possible conflict with group G1 address.

If the response to the query of step S212 is affirmative then the receiving device is also host H2. In that case, the example method further queries whether host H1 has priority over host H2 in step S214. If the response to the query of step S214 is affirmative, then the example method proceeds to step S216 in which the host H2 picks an alternate multicast address G2 that is distinct from G1 for its multicast group. In step S218, host H2 initiates the procedure for sending PickedMulticastAddress (G2) to its multicast group. If the response to the query of step S214 is negative, then host H2 sends or broadcasts a RejectMulticastAddressPacket to H1 by including the host H2's address, thereby ensuring that host H1 will pick a distinct multicast address for its group.

Those of skill in the art will readily appreciate that although various aspects and features of the presently claimed invention have been described with reference to a multicast address, the principles of the presently claimed invention are equally well-suited to other types of wireless addresses. For example, the systems and methods described herein can be applied to any node network having unique identifiers and a special node such as a host that collectively define a multicast group. By way of non-limiting example, aspects and features of the presently claimed invention can be employed in all types of wireless networks, including those supported by Internet Protocol (IP) addressing and the IEEE 802.11 series of networks, such as for example wireless personal area networks (WPAN), wireless local area networks (WLAN) including WiFi and Fixed Wireless Data networks, wireless metropolitan area networks (WiMAX) as well as both Global System for Mobile Communication (GSM) and Personal Communications Service (PCS) networks. Those of skill in the art will recognize that the various inventive aspects and features described herein can be readily applied to at least the aforementioned types of communications protocols and networks.

Unless specifically stated otherwise, as apparent from the preceding discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform including for example the host device 12 and client device 20 described in detail above.

The preceding descriptions are related to selected aspects and preferred examples of the systems and methods of the presently claimed invention. It should be understood by those of skill in the art that these descriptions are exemplary in nature, and that the full scope and import of the presently claimed invention is defined with reference to the following claims.

What is claimed is:

1. A method executed on hardware for selecting a multicast address to avoid conflicts in a digital communication system, the method comprising the steps of:
    wirelessly broadcasting a first multicast address selected by a first host to at least one first client in a predetermined geographic area;
    wirelessly broadcasting the first multicast address selected by a second host to at least one second client in the predetermined geographic area, each of the first host and the second host independently selecting the first multicast address;
    determining a priority between the first host and the second host when the second host receives the first multicast address rebroadcast by the first client; and
    changing to a second multicast address by a least priority host of the first host and the second host.

2. The method of claim 1 further comprising the steps of:
    detecting the at least one second client being in the predetermined geographic area by the first host;
    receiving the first broadcast multicast address by the at least one second client from the first host; and
    rebroadcasting the received first multicast address on a first hop count to the second host.

3. The method of claim 2 further comprising a highest priority host from the first host and the second host transmitting a reject multicast address packet on a second hop count.

4. The method of claim 3 further comprising the step of rebroadcasting the rejected multicast address by the at least one first client or the at least one second client.

5. The method of claim 2 further comprising repeating steps for the second multicast address.

6. The method of claim 1 further comprising the step of a highest priority host of the first host and the second host sending a reject multicast address to the least priority host.

7. The method of claim 1 further comprising the step of transmitting a confirm new address by the at least one first client or at least one second client when the step of changing to the second multicast address is made.

8. The method of claim 1 further comprising the step of repeating steps for the second multicast address.

9. A hardware system for selecting a multicast address to avoid conflicts in a digital communication system comprising:
    means for wirelessly broadcasting a first multicast address selected by a first host to at least one first client in a predetermined geographic area;
    means for wirelessly broadcasting the first multicast address selected by a second host to at least one second client in the predetermined geographic area, each of the first host and the second host independently selecting the first multicast address;
    means for determining a priority between the first host and the second host when the second host receives the first multicast address rebroadcast by the first client; and
    means for changing to a second multicast address by a least priority host of the first host and the second host.

10. The hardware system of claim 9 further comprising:
    means for detecting the at least one second client being in the predetermined geographic area by the first host;
    means for receiving the first broadcast multicast address by the at least one second client from the first host; and
    means for rebroadcasting the received first multicast address on a first hop count to the second host.

11. The hardware system of claim 10 further comprising a means for transmitting a reject multicast address packet on a second hop count by a highest priority host from the first host and the second host.

12. The hardware system of claim 11 further comprising a means for rebroadcasting the rejected multicast address by the at least one first client or the at least one second client.

13. The hardware system of claim 9 further comprising a means for sending a reject multicast address to the least priority host by a highest priority host of the first host and the second host.

14. The hardware system of claim 9 further comprising a means for transmitting a confirm new address by the at least one first client or at least one second client concurrently with the means for changing to the second multicast address.

15. A non-transitory storage media comprising program instructions which are hardware computer-executable to implement a selection of a multicast address to avoid conflicts in a digital communication system, the storage media comprising:
    program instructions that cause a first multicast address to be selected and wirelessly broadcast by a first host to at least one first client in a predetermined geographic area;
    program instructions that cause the first multicast address to be selected and wirelessly broadcast by a second host to at least one second client in the predetermined geographic area, each of the first host and the second host independently selecting the first multicast address;
    program instructions that cause a priority to be determined between the first host and the second host when the second host receives the first multicast address rebroadcast by the first client; and
    program instructions that cause a change to a second multicast address by a least priority host of the first host and the second host.

16. The non-transitory storage media of claim 15 further comprising:
    program instructions that cause a detection of the at least one second client being in the predetermined geographic area by the first host;

program instructions that cause a receipt of the first broadcast multicast address by the at least one second client from the first host; and program instructions that cause a rebroadcast of the received first multicast address on a first hop count to the second host.

17. The non-transistory storage media of claim 16 further comprising program instructions that cause a transmission of a reject multicast address packet on a second hop count by a highest priority host from the first host and the second host.

18. The non-transistory storage media of claim 17 further comprising program instructions that cause a rebroadcast of the rejected multicast address by the at least one first client or the at least one second client.

19. The non-transistory storage media of claim 15 further comprising program instructions that cause a highest priority host of the first host and the second host to send a reject multicast address to the least priority host.

20. The non-transistory storage media of claim 15 further comprising program instructions that cause a transmission of a confirm new address by the at least one first client or at least one second client concurrently with the program instructions to change to the second multicast address.

21. A method for preventing conflicts in a multicast address digital communication system, the method comprising the steps of:

receiving a first multicast address selected and wirelessly broadcast by a first device in a first predetermined geographic area at a second device in a second predetermined geographic area, wherein the second predetermined geographic area is at least partially distinct from the first predetermined geographic area, the first and second predetermined geographic areas respectively defined by wireless signal ranges of the first and second devices;

wirelessly rebroadcasting, in the second predetermined geographic area, the first multicast address by the second device; and wirelessly receiving the first multicast address by at least a wireless third device in the second predetermined geographic area, the wireless third device configured to independently select a second multicast address instead of the first multicast address as wirelessly received.

22. The method of claim 21, wherein the first device is one of a client or a host.

23. The method of claim 21, wherein the second device is one of a client or a host.

24. The method of claim 21, wherein the third device is one of a client or a host.

25. The method of claim 21, further comprising the step of: at the third device, determining whether the first multicast address and the second multicast address selected by the third device are identical.

26. The method of claim 25, further comprising the step of: in response to the first multicast address and the second multicast address being identical, determining a priority between the first and second devices.

27. The method of claim 26, further comprising the step of: in response to the first device having priority over the second device, selecting at the third device a third multicast address distinct from the second multicast address.

28. The method of claim 26, further comprising the step of: in response to the second device having priority over the first device, selecting at the first device a third multicast address distinct from the first multicast address.

29. A hardware system for preventing conflicts in a multicast address digital communication system, comprising:

means for receiving a first multicast address selected and wirelessly broadcast by a first device in a first predetermined geographic area at a second device in a second predetermined geographic area, wherein the second predetermined geographic area is at least partially distinct from the first predetermined geographic area, the first and second predetermined geographic areas respectively defined by wireless signal ranges of the first and second devices;

means for wirelessly rebroadcasting, in the second predetermined geographic area, the first multicast address by the second device; and means for wirelessly receiving the first multicast address by at least a wireless third device in the second predetermined geographic area, the wireless third device configured to independently select a second multicast address instead of the first multicast address as wirelessly received.

30. The hardware system of claim 29, wherein the first device is one of a client or a host.

31. The hardware system of claim 29, wherein the second device is one of a client or a host.

32. The hardware system of claim 29, wherein the third device is one of a client or a host.

33. The hardware system of claim 29, further comprising a means for determining whether the first multicast address and the second multicast address selected by the third device are identical at the third device.

34. The hardware system of claim 33, further comprising a means for determining a priority between the first and second devices in response to the first multicast address and the second multicast address being identical.

35. The hardware system of claim 34, further comprising a means for selecting at the third device a third multicast address distinct from the second multicast address in response to the first device having priority over the second device.

36. The hardware system of claim 34, further comprising a means for selecting at the first device a third multicast address distinct from the first multicast address in response to the second device having priority over the first device.

37. A non-transitory storage media comprising program instructions which are hardware computer-executable to implement a prevention of conflicts in a multicast address digital communication system, the storage media comprising:

program instructions that cause a receipt of a first multicast address selected and wirelessly broadcast by a first device in a first predetermined geographic area at a second device in a second predetermined geographic area, wherein the second predetermined geographic area is at least partially distinct from the first predetermined geographic area, the first and second predetermined geographic areas respectively defined by wireless signal ranges of the first and second devices;

program instructions that cause a wirelessly rebroadcast, in the second predetermined geographic area, of the first multicast address by the second device; and program instructions that cause a wireless receipt of the first multicast address by at least a wireless third device in the second predetermined geographic area, the wireless third device configured to independently select a second multicast address instead of the first multicast address as wirelessly received.

38. The non-transistory storage media of claim 37, wherein the first device is one of a client or a host.

39. The non-transistory storage media of claim 37, wherein the second device is one of a client or a host.

40. The non-transistory storage media of claim 37, wherein the third device is one of a client or a host.

41. The non-transistory storage media of claim 37, further comprising program instructions that cause a determination of whether the first multicast address and the second multicast address selected by the third device are identical at the third device.

42. The non-transistory storage media of claim 41, further comprising program instructions that cause a determination of a priority between the first and second devices in response to the first multicast address and the second multicast address being identical.

43. The non-transistory storage media of claim 42, further comprising program instructions that cause a selection at the third device of a third multicast address distinct from the second multicast address in response to the first device having priority over the second device.

44. The non-transistory storage media of claim 42, further comprising program instructions that cause a selection at the first device of a third multicast address distinct from the first multicast address in response to the second device having priority over the first device.

* * * * *